United States Patent
Shiraishi et al.

[11] 3,869,194
[45] Mar. 4, 1975

[54] FIBER FOR OPTICAL COMMUNICATION

[75] Inventors: Satoshi Shiraishi; Kunio Fujiwara; Yasuhiko Kumagai; Shiro Kurosaki, all of Osaka, Japan

[73] Assignee: Sumitomo Electric Industries Ltd., Osaka, Japan

[22] Filed: July 3, 1973

[21] Appl. No.: 376,270

[30] Foreign Application Priority Data
July 3, 1972  Japan.............................. 47-66554

[52] U.S. Cl........ 350/96 WG, 117/33.3, 117/110.6, 350/96 R
[51] Int. Cl. ................................................ G02b 5/14
[58] Field of Search ..................... 350/96 WG, 96 R

[56] References Cited
FOREIGN PATENTS OR APPLICATIONS
1,155,795   6/1969   Great Britain ................ 350/96 WG Primary Examiner—John K. Corbin
Attorney, Agent, or Firm—Sughrue, Rothwell, Mion, Zinn, & Macpeak

[57] ABSTRACT

A fiber for use in an optical communications system has a core of mainly fused quartz glass of high purity having uniform refractive index in section, and an organic material coated around the outer periphery of said core and having a lower refractive index than that of said core. By choosing the half amplitude width of the incident light beam with respect to the core diameter, the increase in transmission loss due to the excitation of higher order modes is held to a minimum. The loss due to higher order mode excitation is further reduced by choosing a cladding having a dielectric loss tangent value of about 1000 times the dielectric loss tangent in the core. Thus, the fiber may be used as an optical transmission line.

1 Claim, 9 Drawing Figures

FIBER FOR OPTICAL COMMUNICATION

BACKGROUND OF THE INVENTION

1. Field of the Invention

This invention relates to optical communications, and more particularly to a fiber for use in optical communications systems and having a core of fused quartz of high purity in plastic cladding.

2. Description of the Prior Art

The transmission line for optical communications must necessarily have less loss than that of a conventional optical fiber (absorption loss $\alpha = 10^{-4-5/cm}$). The optical properties of optical glass and organic compounds have been extensively studied, and it is understood that the absorption loss of fused quartz is superior in absorption loss to natural quartz and the difference of this loss depends upon the content of impurities contained in the fused quartz, particularly transition metals. There exists, as being well known, a cladding-type fiber which has a higher refractive index in the center than that of the cladding. As an example, a fiber material having a high refractive index core containing $TiO_2$ in fused quartz and a fused quartz cladding is disclosed, for example in U.S. Pat. No. 3,659,915. The core may be made of high refractive index in the presence of an additional compound in the core, but the presence of the addition compound often produces undesirable effects. For example, the oxidizing state of titanium is apt to generate a coloring ion therein.

When fused quartz of high purity is used for the core, it is necessary to select a material having a lower refractive index $nd$ of the fused quartz, $nd = 1.458$, as the cladding and the examples thereof will now be described:

1. Fluoride glass, $nd=1.448$, is remolten and is coated on the optical glass. A disadvantage of the resulting structure resides in the fact that the heat of expansion coefficients of fused quartz and fluoride glass are different so that the fiber structure cannot be maintained.

2. An addition compound, for example fluoride, is added to the fused quartz. The disadvantages in this case are that the differences of the refractive indices are less, and the resulting fiber has poor bending and excitation characteristics making it unsuitable as an optical transmission line.

3. Fluoride is deposited on the fused quartz, but the resulting thickness of the deposited film is thin.

The resin containing fluorine, as will be described, provides high refractive index difference and easy coating as its advantages, but as it has generally high loss, it could not heretofore be used in optical communications systems. However, it has been found by theoretical analysis and execution of the present invention that proper excitation makes possible sufficiently low loss that such fibers can be effectively used as an optical transmission line.

SUMMARY OF THE INVENTION

It is, therefore, an object of the present invention to provide a fiber for an optical communications system which has low transmission loss.

It is another object of the present invention to provide a fiber for an optical communications system which attenuates higher order modes and transmits only relatively lower order modes so as to obtain preferable low signal distortion.

According to one aspect of the present invention, there is provided a fiber for an optical communications system which comprises a core of mainly fused quartz glass of high purity having uniform refractive index in section, and an organic material coated around the outer periphery of said core and having lower refractive index than that of said core such as containing fluorine of lower refractive index than the fused quartz glass of the core.

According to another aspect of the present invention, there is provided a method of manufacturing a fiber for an optical communications system which comprises the steps of coating a fused quartz monofilament with a dispersion produced from fine particles of any one of polytetrafluoroethylene, tetrafluoroethylene-hexafluoropropylene copolymer, polychlorotrifluoroethylene, polyvinylidene fluoride, polytrifluoroisopropylmethacrylate, fluorovinylidene-hexafluoropropylene copolymer, polyvinyl fluoride, drying the thus obtained coated monofilament in a drying furnace and sintering the product thus obtained in a sintering furnace. Alternatively, the above fluoro-plastics can be extruded onto the fused quartz monofilament as a core to form a cladding on the monofilament. In this case, it is not always necessary to dry and sinter the resulting monofilament covered with the plastics.

These and other objects, features and advantages of the present invention will become more fully apparent from the following description taken in conjunction with the accompanying drawings.

DETAILED DESCRIPTION OF THE PREFERRED EMBODIMENTS

In order to understand the fiber for optical communications of the present invention, the theoretical foundation of the present invention will now be described.

Figure 1:
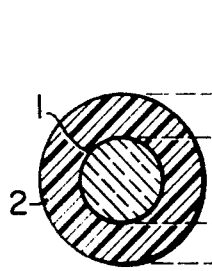
FIG. 1 is a view of the construction of the transmission line for an optical communications system according the present invention.

In FIG. 1, numeral 1 represents a core made of fused quartz of high purity, 2 a cladding layer of organic material having a uniform thickness on the core 1.

Figure 2:
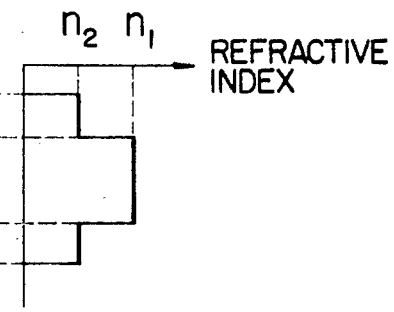
FIG. 2 is a view of the distribution state of the refractive index in transverse section of the transmission line in FIG. 1.

In FIG. 2, the ordinate shows the distance measured along a diameter the core 1, and the abscissa shows the refractive index.

Generally, when a normalized frequency $V$ defined by the following formula (1) is less than 2.405, the fiber operates as a single-mode fiber for transmitting only the $HE_{11}$ mode as the fundamental mode, but when the normalized frequency $V$ is over 2.405, the fiber operates as a multi-mode fiber.

$$V = 2\pi/\lambda \rho \sqrt{n_1^2 - n_2^2} \qquad (1)$$

where, $\lambda$: a wavelength, $\rho$: the radius of the core, $n_1$: the refractive index of the core, and $n_2$: the refractive index of the cladding.

Here, the incident conditions and excitation conditions of the light beam with respect to the multi-mode fiber will now be investigated.

Figure 3:
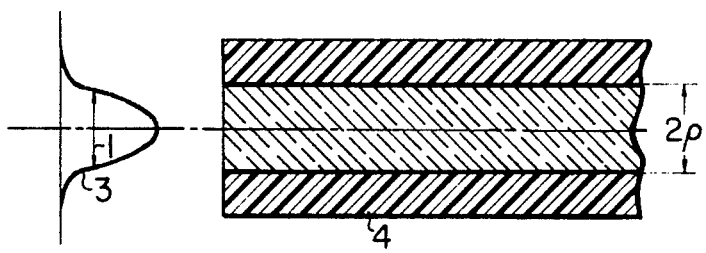
FIG. 3 is a longitudinal sectional view of the fiber of this invention in a certain operation for explanatory purpose.

FIG. 3 shows a dimensional relationship between a multimode fiber 4 and the light beam 3 projected on the core and at the center of the multimode fiber 4. In FIG. 3, the light beam 3 having in cross section an intensity distribution curve in the shape of the Gaussian function has a half amplitude width $T$ as shown as a function of the longitudinal cross section of the multimode fiber 4 having the core of diameter $2\rho$ as also shown.

In FIG. 3, when a light beam 3 having the half amplitude width $T$ is projected at the center of the core of diameter $2\rho$ of a multimode fiber 4, modes of $HE_{1n}$ ($n=1, 2, \ldots$) are excited in the fiber 4 with the power excitation efficiency $\eta n$.

Figure 4:
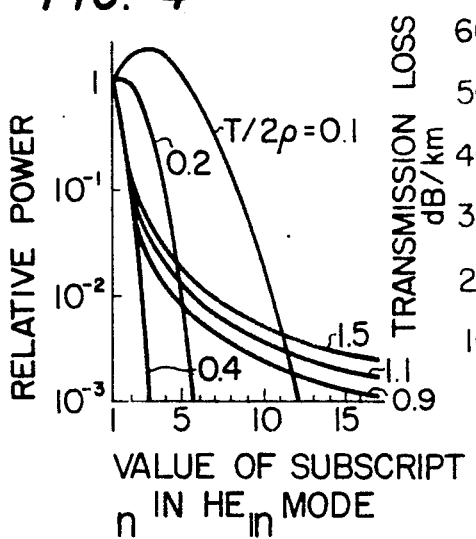
FIG. 4 is a graph showing the relative power distribution of the respective modes with a parameter of half amplitude width of light beam with respect to the diameter of the core.

FIG. 4 shows the relative power distribution over the modes $H_{1n}$ ($n = 1, 2, \ldots$) in accordance with the parameters $T/2 \rho = 0.1, 0.2, \ldots 1.5$ of normalized half amplitude width of light beam 3. The relative power is defined by the quotient of $\eta n$ divided by $\eta 1$, wherein $\eta n$ is the power excitation efficiency of the $H_{1n}$ mode and $\eta 1$ is the power excitation efficiency of the $H_{11}$ mode.

It is readily understood from FIG. 4 that when the half amplitude width $T$ of light beam 3 is considerably smaller than the diameter $2\rho$ of the core, for example $T/2 \rho = 0.1, 0.2, \ldots$, the relative power distribution over higher modes $H_{1n}$, ($n = 2, 3, \ldots$) is increased remarkably. On the other hand, if the half amplitude width $T$ is approximately the same as or more than the diameter $2\rho$ of the core, for example, $T/2 \rho = 0.9, 1.0, \ldots$, the relative power distribution over these higher modes is minimized.

Thus, the transmission loss of each higher mode in optical fiber 4 depends on the wave length $\lambda$, radius of the core $\rho$, refractive indices of the core and cladding, $n_1$ and $n_2$ dielectric tangent of the core $\tan \delta 1$ and that of the cladding $\tan \delta 2$.

Figure 5:
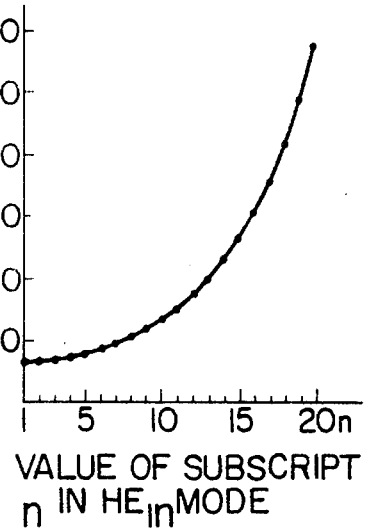
FIG. 5 is a graph showing the transmission loss with respect to the respective modes excited in the fiber of this invention.

FIG. 5 shows the transmission loss of each higher modes of an optical fiber having the parameters of $n_1 = 1.46$, $n_2 = 1.44$, $\tan \delta 1 = 1 \times 10^{-9}$, $\tan \delta 2 = 1 \times 10^{-5}$, $\lambda = 0.6 \mu m$.

According to FIG. 5, the transmission loss of higher modes is remarkably greater traansmission loss.

Figure 6:
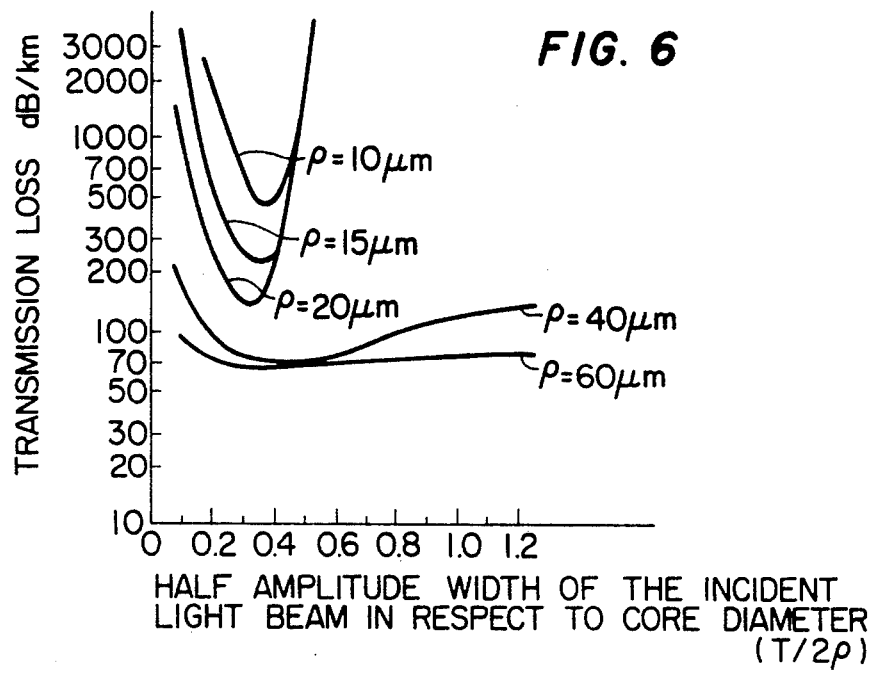
FIG. 6 is a graph showing the transmission loss of a fiber with respect to the half amplitude width of incident light beam in relation to the diameter of the core.

FIG. 6 shows the relationship between the total transmission loss of whole higher modes in an optical fiber and the value of the normalized half amplitude width $t/2 \rho$ of the light beam 3 as a function of the radius of the core of the fiber. In FIG. 6, it is understood that there exists a half amplitude width $T$ of the light beam giving a minimum total transmission loss of whole higher modes between 0.2 and 0.6 of $T/2 \rho$ where $\rho n$ is small, but such minimum range of total loss is spread over 0.2 - 1.2 of $T/2 \rho$ where $\rho$ is large. In many cases, there exists a minimum total transmission loss between 0.3 -0.6 of $T/2 \rho$.

For example, in the case where the radius of the core is $20 \mu m$, the $T/2 \rho$ of the incident light beam for obtaining minimum transmission loss is approximately 0.3, and if the value of $T/2 \rho$ deviates from this value slightly, the total transmission loss increases greatly.

Figure 7:
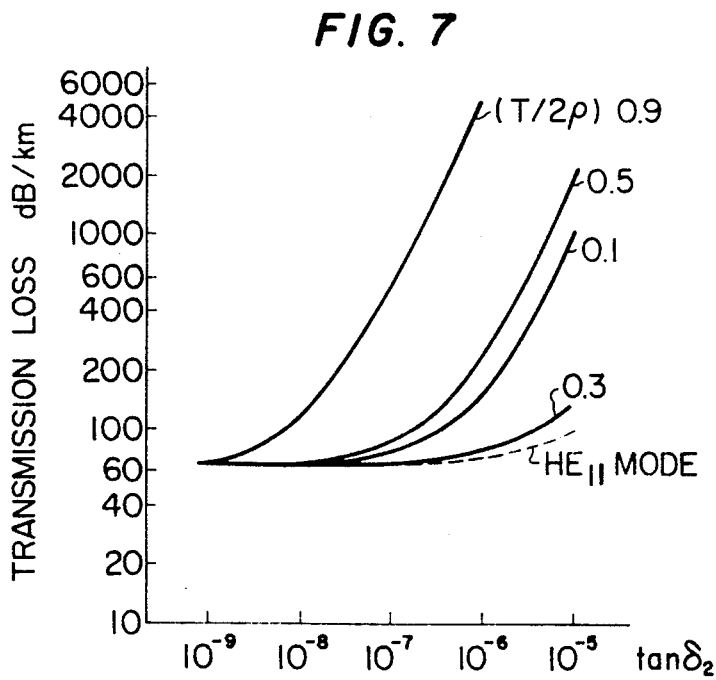
FIG. 7 is a graph also showing the transmission loss with respect to the dielectric loss tangent of the cladding with a parameter of half amplitude width of light beam.

FIG. 7 shows the relationship between the total transmission loss shown by solid lines and the transmission loss of $HE_{11}$ mode shown by dotted line as a function of the dielectric tangent $\delta 2$ of the cladding of a multimode fiber, in which the multimode fiber has the parameters, $n_1 = 1.46$, $n_2 = 1.44$, $\tan \delta 1 = 1 \times 10^{-9}$, $\rho = 20 \mu m$, and the incident wave of wave length $\lambda = 0.6 \mu m$ are used.

As described above, when the radius of the core is $20 \mu m$, the optimum value of half amplitude width $T/2 \rho$ of the incident light beam normalized by the diameter of the core for obtaining minimum total transmission loss exists in the proximity of approximately 0.3, and it is understood further from FIG. 7 that the increment of the total transmission loss in the case of $T/2 \rho = 0.3$ does not exceed about 10% over very wide range of dielectric loss $\tan \delta 2$ from $10^{-9}$ to $10^{-5}$.

This fact is due to an organic material having such a large dielectric loss $\tan \delta 2$ as $1 \times 10^{-5}$ used for the cladding layer covering the core of quartz of dielectric loss $\tan \delta 1 = 1 \times 10^{-9}$.

From the above studies, the following results are obtained:

1. If the half amplitude width of the incident light beam with respect to the diameter of the core is set to a value determined by the radius of the core, the increase of the transmission loss is held to within 10% even if a cladding having a dielectric loss tangent with a value of 1000 times with respect to the dielectric loss tangent in the core is used.

2. A fiber using a cladding having a dielectric loss tangent value of about 1000 times the dielectric loss tangent in the core has an increasingly large attenuation in the higher order modes since in these modes the electromagnetic field is relatively largely confined to the cladding. By contrast, the attenuation is constant as shown by the dotted line in FIG. 7 for the $HE_{11}$ mode, this being the fundamental mode.

From the above studies, if the condition of the light incident to the fiber with a cladding of larger dielectric loss tangent than that of the core is set so as to suppress the generation of the higher order modes, then a. the fiber provides a low transmission loss characteristic, and b. the fiber transmits only relatively lower order modes with the higher order modes attenuated.

c. From the foregoing facts, it is apparent that a low signal distortion characteristic is obtained.

With this theoretical background, specific examples of the present invention wherein a fiber is clad with organic material will now be described.

As the organic material, the fluoro-plastics are preferred. The refractive index of fluro-plastics such as polytetrafluoroethylene, tetrafluoroethylene-hexafluoropropylene copolymer, polychlorotrifluoroethylene, polyvinylidene fluoride, polytrifluoroisopropylmethacrylate, fluorovinylidene-hexafluoropropylene copolymer, polyvinyl fluoride is lower by 0.03 to 0.1 when compared with the fused quartz so as to sufficiently maintain the required characteristic as the cladding fiber.

Examples of manufacturing the fiber clad with the organic resin will now be described according to the present invention.

Figure 8:
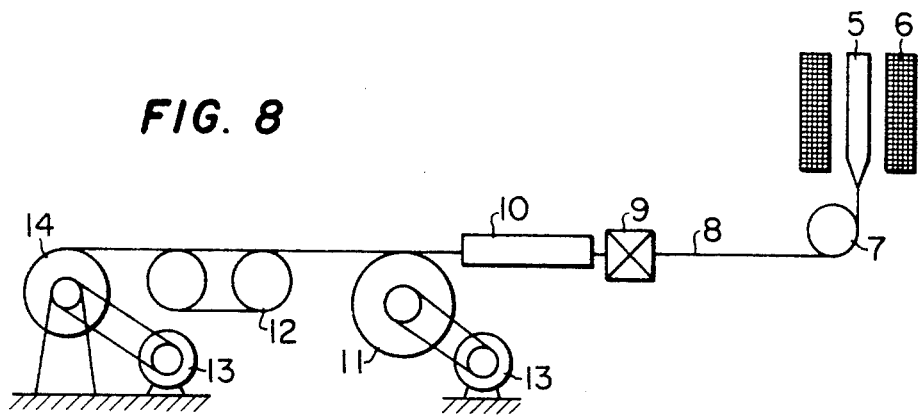
FIG. 8 is a schematic system view of one embodiment of coating by extrusion of the organic resin on the core to form the fiber of this invention.
Figure 9:
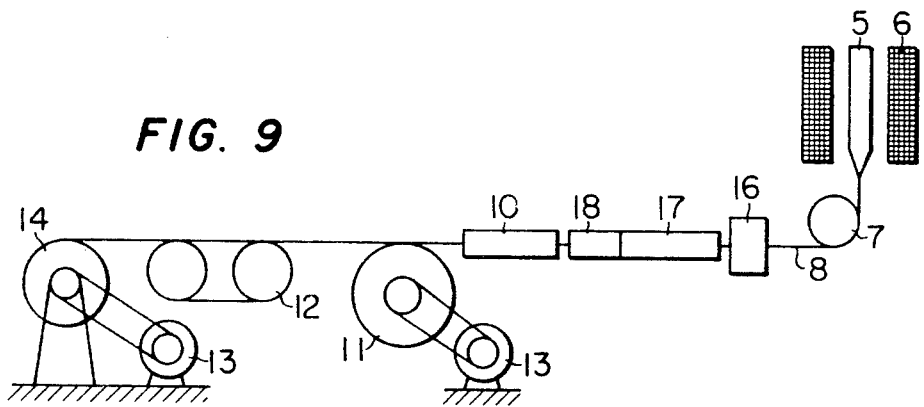
FIG. 9 is a schematic system view of another embodiment of coating by dispersion of particles of organic resin.

In these examples there is described a method of coating the organic resin having lower refractive index than that of the core at the outside of the core composed mainly of the material of fused quartz of high purity having uniform refractive index, first by coating by the extrusion of the organic resin (FIG. 8), and second by coating with a dispersion of fine powder organic resin (FIG. 9).

EXAMPLE 1

FIG. 8 shows an illustrative embodiment of a method of coating organic resin by extrusion.

In this method, a fused quartz glass bar 5 to become a core is heated and pulled by a fiber-pulling furnace 6, and after that, the fused quartz core 8 is introduced through a guide roller 7 to a cross-head of extruder 9 and a water cooling trough and thereby 10 becomes a plastic cladded fiber. Numeral 11 represents a capstan roller for drawing the fiber at a constant speed, 14 is a take-up bobbin, 12 a dancer roller for absorbing the variation in fiber length produced by the speed difference between the capstan roller 11 and the take-up bobbin 14, 13 and a driving motor.

Since the factor for determining the diameter of the core in this example is the line speed of the fiber, the rotary speed of the capstan roller 11 must be accurately controlled. Further, the factor for determining the tension applied to the fiber between the capstan roller 11 and the take-up bobbin 14 is the dancer roller 12, and the response of the dancer roller 12 must be sufficiently fast, and the set tension must be less than 100 g.

EXAMPLE 2

FIG. 9 shows coating by the a dispersion of the fine powder organic resin. This example will now be described with reference to the case of tetrafluoroethylene hexafluoropropylene copolymer($nd=1.288$)

Approximately 10 mm$\phi$ wide of fused quartz circular bar of high purity for the core is treated by flame polishing and fluoric acid cleaning in order to eliminate dirts and scratches on the surface of the circular bar, and thereafter it is heated to approximately 1800°C. at the fiber-pulling furnace 6 and is pulled so as to become a monofilament 8 of approximately 50$\mu\phi$. This monofilament is introduced through the guide roller 7 to the dispersion trough 16, spattered with a fine powder of the copolymer, and after it is coated to a predetermined thickness, it is then dried primarily in the drying furnace 17 where the solvent or the like is evaporated, and the copolymer is thereafter sintered in the sintering furnace 18 at approximately 380° C. Then, it is cooled by a water trough 10 and wound on the take-up bobbin 14.

When the loss of the optical transmission line manufactured thus as above is measured, there is obtained a loss of 21$d$B/km which compares favorably with the loss of 20$d$B/km for the core material.

It should be understood from the foregoing description that since the fiber for optical communications of this invention is thus constructed, it has low transmission loss and attenuates higher modes and transmits only relatively lower order modes so as to obtain preferable low signal distortion characteristics.

What is claimed is:

1. A method of exciting an optical fiber of the type consisting of a core of high purity fused quartz glass clad with an organic material having a lower refractive index than that of said core and selected from the group consisting of polytetrafluoroethylene, tetrafluoroethylenehexafluoropropylene copolymer, polychlorotrifluoroethylene, polyvinylidene fluoride, polytrifluoroisopropylmethacrylate, fluorovinylidene-hexafluropropylene copolymer, and polyvinyl fluoride, comprising projecting a Gaussian light beam of 0.3 to 0.6 of $T/2\rho$, wherein $T$ represents the half amplitude width of the light beam and $\rho$ represents the radius of the core, over the cross section of the optical fiber.

* * * * *